United States Patent [19]

Tashiro et al.

[11] Patent Number: 4,777,611
[45] Date of Patent: Oct. 11, 1988

[54] APPARATUS FOR DETECTING ABNORMAL VARIATIONS OF WHEELS OF VEHICLE

[75] Inventors: Syuzaburou Tashiro, Okazaki; Toshikazu Ina, Nagoya; Hisasi Kawai, Toyohashi, all of Japan

[73] Assignee: Nippon Soken, Inc., Nishio, Japan

[21] Appl. No.: 840,082

[22] Filed: Mar. 17, 1986

[30] Foreign Application Priority Data

Mar. 18, 1985 [JP] Japan .................. 60-53834

[51] Int. Cl.$^4$ .............................................. G01P 3/04
[52] U.S. Cl. ................................ 364/565; 364/551.01; 364/426.01; 324/161
[58] Field of Search ............... 364/426, 424, 550, 561, 364/565, 566; 303/96, 92, 94; 324/161, 168; 340/62, 52 F

[56] References Cited

U.S. PATENT DOCUMENTS

| | | | |
|---|---|---|---|
| 3,912,034 | 10/1975 | Pallof | 340/62 |
| 4,066,300 | 1/1978 | Devlin | 324/161 |
| 4,114,957 | 9/1978 | Eichhorst | 324/161 |
| 4,486,839 | 12/1984 | Mazur et al. | 364/426 |
| 4,546,437 | 10/1985 | Bleckmann et al. | 364/426 |
| 4,549,163 | 10/1985 | Satoh et al. | 340/52 R |
| 4,566,737 | 1/1986 | Masaki et al. | 364/426 |

FOREIGN PATENT DOCUMENTS 54-33772 3/1979 Japan .

Primary Examiner—Parshotam S. Lall
Assistant Examiner—Thomas G. Black
Attorney, Agent, or Firm—Cushman, Darby & Cushman

[57] ABSTRACT

In an apparatus for detecting abnormal variation of wheels of a vehicle, a plurality of rotation sensors detect variations in rotation speeds of a plurality of wheels during running of the vehicle. Detection signals produced from the plurality of rotation sensors are converted into arithmetic operation signals by means of a signal converter. An arithmetic operation processor is responsive to the arithmetic operation signals from the signal converter to compute rates of variations in the rotation speeds. The arithmetic operation processor also compares the computed rates of variations with each other to decide whether wheels exist which have a rate of variation abnormally deviating from rates of variations of the other wheels. An alarm unit is responsive to decision signals from the arithmetic operation processor to alert abnormality of the wheels having the abnormally deviating variation rate.

6 Claims, 4 Drawing Sheets

FIG. I
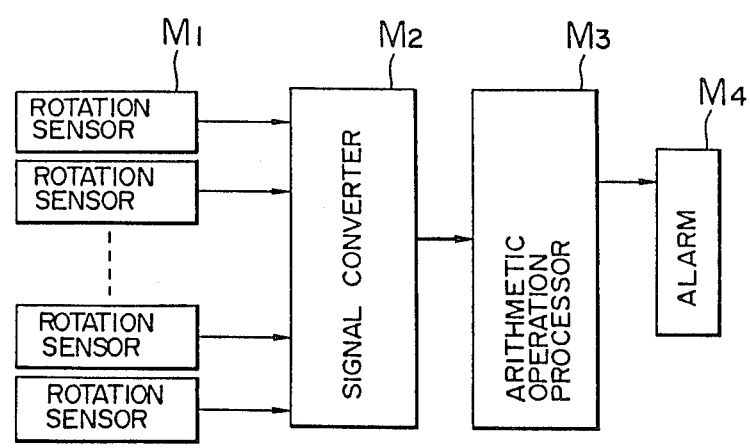
FIG. 3
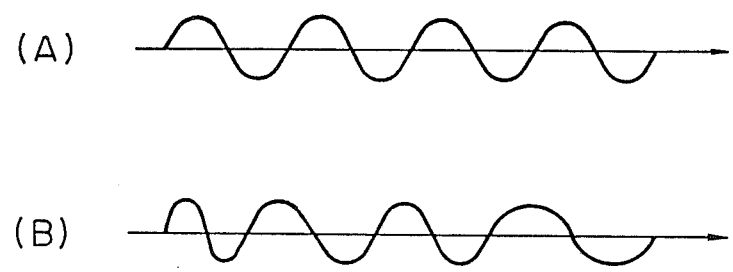

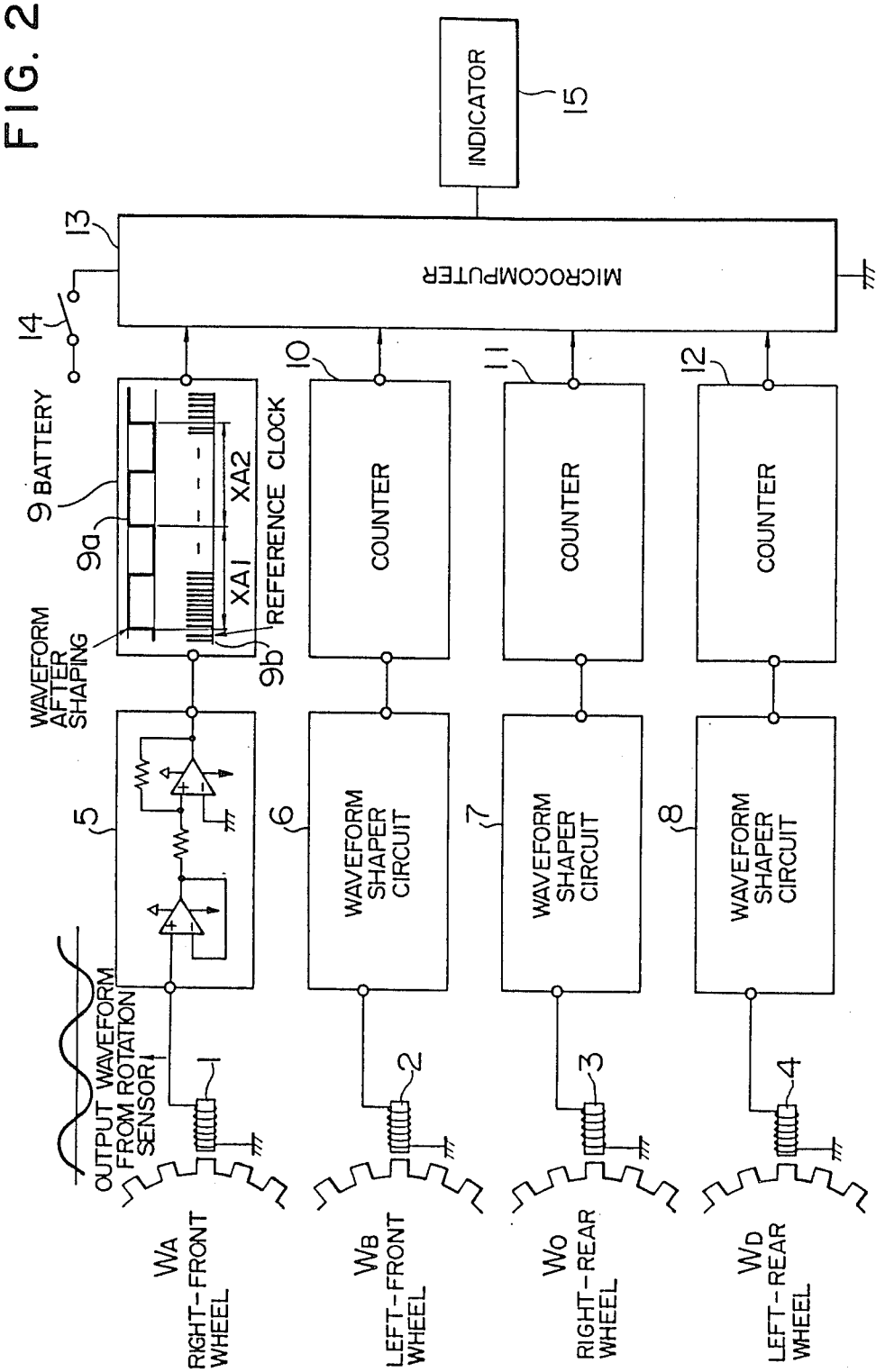

APPARATUS FOR DETECTING ABNORMAL VARIATIONS OF WHEELS OF VEHICLE

BACKGROUND OF THE INVENTION

This invention relates to an apparatus for detecting such abnormalities of wheels of a vehicle as due to a puncture of any of the tires which are caused during running of the vehicle.

As well known in the art, many of the fundamental requirements of a vehicle such as safety comfort and economy depend on performance of the tire. One of factors in managing tire performance is air pressure charged in the tires.

An air pressure sensor is conventionally provided for individual tires to detect the air pressure, and an inner pressure of the tire is directly detected by the air pressure sensor. This air pressure sensor, however, rotates along with the tire. Accordingly, a sensor signal must be sent to a judging circuit through a contactless transmission unit, giving rise to a very complicated and expensive detection apparatus. Disadvantageously, the air pressure sensor is required to be of high durability and reliability because it is used in a bad environment greatly affected by vibrations, shocks, centrifugal force and temperatures.

Methods for indirect detection of the air pressure include a proposal wherein the distance between an axle of each of the four wheels and the ground is measured, and a tire having a reduced distance from its axle is considered to be abnormal in air pressure. Another proposal as disclosed in Japanese Patent Unexamined Publication No. 54-33772 wherein rotation speeds of the four wheels are detected and a tire rotating at a higher rotation speed is determined to be abnormal in air pressure. The former proposal is disadvantageous in that stable judgement is possible only when the vehicle remains stopped, preventing rapid detection of the distance when tire puncture occurs during running of the vehicle. The distance from the ground will also become difficult to measure depending on the topographic geometry (evenness or unevenness) of the ground. The latter proposal utilizes a decrease in tire diameter due to a decreased air pressure to detect rotation speeds of the four wheels, thereby deciding that a tire rotating at a higher rotation speed is abnormal. Accordingly, taking an instance wherein, in respect of the right and left wheels, the rotation speed of the inside wheel becomes different from that of the outside wheel when the vehicle travels along a curved path, for example, the inside wheel rotation speed must be corrected by a steerage angle due to steering. The latter proposal is therefore required to have an additional sensor or the like for detection of steering angles which makes the construction complicated. In addition, the judgement will become difficult to achieve when the tire wears down and its diameter decreases.

SUMMARY OF THE INVENTION

An object of this invention is to provide an apparatus for detecting abnormal variations of wheels of a vehicle which using a method that is free from the complexity of construction attributable to the steerage angle correction when steering, and which can accurately detect abnormalities of wheels inclusive of tires by using only detection signals from rotation sensors when the wheels become abnormal during running of the vehicle.

To accomplish the above object, according to the invention, there is provided an apparatus for detecting abnormal variations of wheels of a vehicle comprising: a plurality of rotation sensors ($M_1$) for detecting variations in rotation speeds of a plurality of wheels running of the vehicle; signal conversion means ($M_2$) for converting detection signals outputted from the plurality of rotation sensors ($M_1$) into arithmetic operation signals necessary for computing rates of variations in the rotation speeds; arithmetic operation processing means ($M_3$) being responsive to the arithmetic operation signals to compute the rates of variations and comparing the computed rates of variations with each other, for deciding whether wheel or wheels exist which have a rate of variations abnormally deviating from rates of variations of the other wheels; and alarm means ($M_4$) responsive to signal or signals from the arithmetic operation processing means ($M_3$) to alert abnormality of the wheel or wheels having the abnormally deviating variation rate.

When the tires are normal, the rates of variations in the rotation speeds, i.e., acceleration or deceleration, of the plurality of wheels fall within a predetermined range. For example, when the vehicle is travelling along a curved path, the inside and outside wheels rotate at different speeds but rates of variations in their rotation speeds are substantially equal to each other as far as their tires are normal. Consequently, the difference between rates of variations in the rotation speeds of the two wheels detected by the rotation sensors becomes almost null, and no alarm is issued.

In the event that any of the tires of the plurality of wheels has abnormality in air pressure owing to, for example, puncture, the rate of variation in the rotation speed of the abnormal wheel becomes larger than that of the other wheels. Thus, the arithmetic operation processing means decides that any of the tires of the plurality of wheels is abnormal, thereby actuating the alarm means to alert the abnormality of tire to the driver.

According to this invention, therefore, abnormalities of the wheels attributable to puncture and other causes liable to occur during high speed running such as a standing wave phenomenon, distortion of tire wheels and relaxation of screws for fitting wheels can be detected accurately by using a simplified construction without resort to the correction by steerage angles when steering.

BRIEF DESCRIPTION OF THE DRAWINGS

FIG. 1 is a schematic block diagram showing an apparatus for detecting abnormal variations of wheels of a vehicle according to an embodiment of the invention;

FIG. 2 is a block diagram illustrating details of the apparatus of FIG. 1;

FIG. 3 illustrates in sections (A) and (B) output waveforms of a rotation sensor shown in FIG. 2;

DESCRIPTION OF THE PREFERRED EMBODIMENTS

Figure 4:
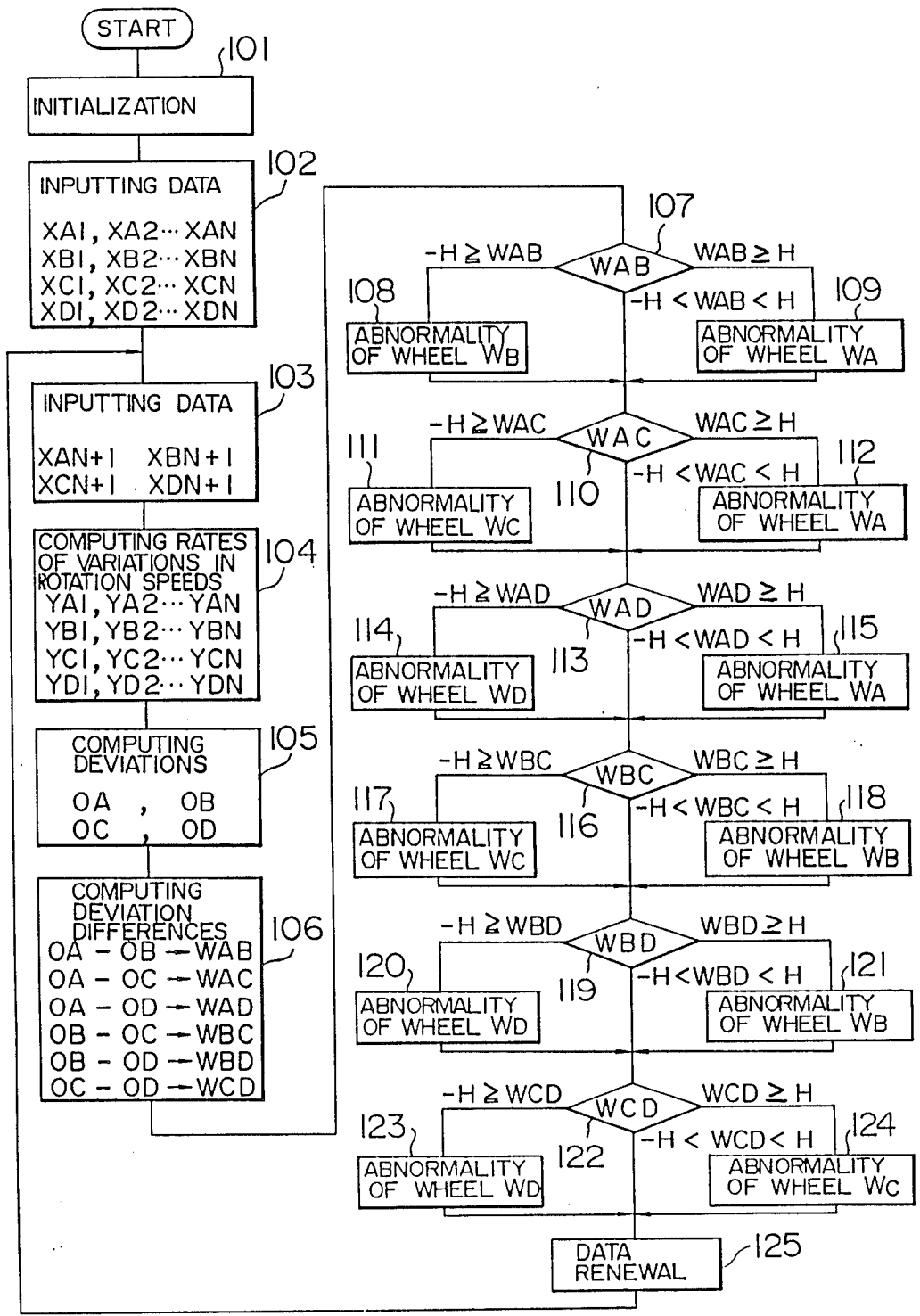
FIG. 4 is a flow chart for explaining a first mode of operation of the apparatus according to the invention.

As schematically shown in FIG. 1, in an apparatus for detecting abnormal variations of wheels of a vehicle embodying the invention, variations in rotation speeds of a plurality of wheels of the vehicle are detected by a plurality of rotation sensors M1 during running of the vehicle. Detection signals outputted from the plurality of rotation sensors M1 are converted by a signal converter M2 into arithmetic operation signals necessary for computing rates of variations in the rotation speeds, i.e., acceleration or deceleration of the wheels. An arithmetic operation processor M3 is responsive to the arithmetic operation signals to compute the rates of variations and compare the computed rates of variations with each other to determine whether wheel or wheels exist which have a rate of variation abnormally deviating from rates of variations of the other wheels. An alarm unit M4 is responsive to signal or signals from the arithmetic operation processor M3 to alert abnormality of the wheel or wheels having the abnormally deviating variation rate.

The apparatus of FIG. 1 is shown in detail in FIG. 2. Referring to FIG. 2, a vehicle has four wheels and variations in rotation speeds of the respective wheels, that is, a right-front wheel $W_A$, a left-front wheel $W_B$, a right-rear wheel $W_C$ and a left-rear wheel $W_D$ are detected by rotation sensors 1, 2, 3 and 4. To this end, the respective wheels $W_A$, $W_B$, $W_C$ and $W_D$ have a disc formed with 36 notches around its circumference, and the tip end of the respective sensors 1 to 4 opposes the notches in close relationship therewith. As the wheels rotate, the respective rotation sensors 1 to 4 generate a sine wave as shown at section (A) or (B) in FIG. 3 which has a frequency proportional to a rotation speed of the respective wheels. The sine wave at (A) in FIG. 3 results from a normal wheel and the sine wave at (B) results from an abnormal wheel, indicating that the rate of variations in the rotation of the abnormal wheel is more disturbed than that of the normal wheel.

Sine wave signals produced from the rotation sensors 1 to 4 are respectively converted into signals necessary for arithmetic operation processing by means of signal converters which are exemplarily constituted herein by waveform shaper circuit 5 and counter 9, waveform shaper circuit 6 and counter 10, waveform shaper circuit 7 and counter 11 and waveform shaper circuit 8 and counter 12, respectively. Each of the waveform shaper circuits 5 to 8 has a buffer for elimination of interaction between the shaper circuits and a comparator for shaping the input sine wave into a pulse train 9a. Each of the counters 9 to 12 is actuated by a reference clock 9b at 1 MHz to measure a time interval or a period between the rise of a pulse and that of an immediately succeeding pulse of the pulse train 9a.

Pieces of data XA1, XA2 --- each representative of one period are read into the arithmetic operation processor, exemplified herein as a microcomputer 13. The microcomputer 13 is responsive to the input data pieces to detect abnormalities of the wheels $W_A$ to $W_D$ and to drive the alarm unit exemplified herein as an indicator 15 which informs the driver of the abnormalities. The indicator 15 can indicate which one of the four wheels is subject to abnormality.

A first mode of operation of the above apparatus will now be described.

The microcomputer 13 is stored in advance with a control program for arithmetic operation of data pieces delivered from the counters 9 to 12. Processing procedures pursuant to the control program are shown in a flow chart of FIG. 4. Thus, the operation will now be described with reference to this flow chart, When the driver turns on a key switch 14 (FIG. 2), the control program according to this invention is started. To describe the operation in each step, memories are initialized in a step 101 and the procedure proceeds to a step 102 in which rotation period data measured by the counters 9 to 12, that is, XA1, XA2 ----- XAN for the right-front wheel $W_A$, XB1, XB2 ----- XBN for the left-front wheel $W_B$, XC1, XC2 XCN for the right-rear wheel $W_C$ and XD1, XD2 ----- XDN for the left-rear wheel $W_D$ are inputted to the microcomputer. The value of N is, for example, about 10,000 so that the decision can be carried out over a travel distance of about 500 to 600 m. If the vehicle travels about 2 m per revolution of tire, the tire makes 275 revolutions over a travel of 550 m. Since the rotation sensor disc has 36 nothces around its circumference and 36 pieces of data per revolution are obtained, 275×36=9900 data pieces are necessary for measurement over the 550 m of travel. Subsequently, in a step 103, the newest rotation period data, that is, XAN+1 for the right-front wheel $W_A$, XBN+1 for the left-front wheel $W_B$, XCN+1 for the right-rear wheel $W_C$ and XDN+1 for the left-rear wheel $W_D$ are inputted to the microcomputer. The procedure then proceeds to a step 104 in which rates of variations in the rotation speeds are computed on the basis of the period data inputted to the microcomputer in the steps 102 and 103. In this computation, calculation formulae (YAi)←(XAi+1)−(XAi), (YBi)←(XBi+1)−(XBi), (YCi)←(XCi+1)−(XCi), and (YDi)←(XDi+1)−(XDi), where i=1∼N, are used. Thus, step 104, calculates the difference in rotation speed of the respective wheels, between a rotation speed at an instant and a rotation speed at an immediately preceding instant.

In a step 105, differences between the data pieces indicative of rates of variations in rotation speeds computed in the step 104 and predetermined normal variation rates are square averaged to obtain deviations of rates of variations in rotation speeds, that is, $\sigma A$ for the right-front wheel $W_A$, $\sigma B$ for the left-front wheel $W_B$, $\sigma C$ for the right-rear wheel $W_C$ and $\sigma D$ for the left-rear wheel $W_D$. Therefore step 105 computes a variation rate deviation of each wheel over a time interval or a travel distance. In a step 106, four deviations computed in the step 105 are compared to each other to obtain deviation differences by computing differences between respective sets of two deviations for each pair of wheels on the basis of calculation formulae $\sigma A - \sigma B \rightarrow WAB$, $\sigma A - \sigma C \rightarrow WAC$, $\sigma A - \sigma D \rightarrow WAD$, $\sigma B - \sigma C \rightarrow WBC$, $\sigma B - \sigma D \rightarrow WBD$ and $\sigma C - \sigma D \rightarrow WCD$. In a step 107, the deviation difference WAB between the right-front wheel $W_A$ and the left-front wheel $W_B$ is compared with threshold values ±H, to determine whether it falls within an allowable range which is defined by −H<WAB<H. If the WAB is within the allowable range, the procedure proceeds to a step 110 in which the deviation difference WAC between the right-front wheel $W_A$ and the right-rear wheel $W_C$ is checked in a similar manner. If −H≧WAB results from decision in the step 107, indicating that the WAB is outside the allowable range, in a step 108, $\sigma B$ is recognized as abnormal in relation to $\sigma A$ and the driver is informed of abnormality of the left-front wheel $W_B$ corresponding to $\sigma B$ through the indicator 15. If WAB≧H results from decision in the step 107, indicating that the WAB is also outside the allowable range, in a step 109, $\sigma A$ is recognized as abnormal in relation to $\sigma B$ and the driver is informed of abnormality of the right-front wheel $W_A$ corresponding to $\sigma A$ through the indicator 15.

Essentially, the ensuing steps 113 to 124 are repetitions of the steps 107 to 109. Thus, the right-front wheel $W_A$ is compared (in terms of deviation difference) with the left-rear wheel $W_D$ in the step 113, the left-front wheel $W_B$ with the right-rear wheel $W_C$ in the step 116, the left-front wheel $W_B$ with the left-rear wheel $W_D$ in the step 119, and the right-rear wheel $W_C$ with the left-rear wheel $W_D$ in the step 122. In this manner, all the combinations of the four wheels are subjected to relative comparisons to detect an abnormal tire or tires. Results of the detection actuate the indicator 15, to alert the abnormality of the driver. When all the tires have been checked for their abnormalities, the procedure proceeds to a step 125 in which the oldest data piece is discarded to rewrite data by renewing respective data strings in accordance with (XAi)←(XAi+1), (XBi)←(XBi+1), (XCi)←(XCi+1) and (XDi)←(XDi+1), where i=1~N.

Accordingly, when executing the above control program, repetitive processing is carried out through a closed loop of the steps 103→104→105→106→107→110→113→116→119→122→125→103 if all of the four wheels $W_A$, $W_B$, $W_C$ and $W_D$ are normal. If the right-front wheel $W_A$ becomes abnormal, the step 107 branches to the step 109, thereby determining that the wheel $W_A$ is abnormal. Similarly, any abnormality of the wheel $W_A$ is determined in the steps 112 and 115. In this case, processing are repeated through a closed loop of steps 103→104→105→106→107→109→110→112→113→115→116→119→122→125→103, actuating the indicator 125 to alert the abnormality of the right-front tire. If the right-front wheel $W_A$ and the left-front wheen $W_B$ become abnormal simultaneously, the step 110 branches to the step 122, thereby deciding that the wheel $W_A$ is abnormal. Similarly, abnormality of the wheel $W_A$ is also decided in the step 115. In addition, the step 116 branches to the step 118, deciding that the wheel $W_B$ is abnormal. Similarly, abnormality of the wheel $W_B$ is decided in the step 121. In this case, processings are repeated through a closed loop of steps 103∝104→105→106→107→110→112→113→115→116→118→119→121→122→125→103, actuating the indicator 15 to alert the abnormalities of the right-front wheel $W_A$ and left-front wheels $W_B$. If the right-front wheel $W_A$, left-front wheel $W_B$ and right-rear wheel $W_C$ become abnormal simultaneously, the step 113 branches to the step 115, deciding that the wheel $W_A$ is abnormal. Also, the step 119 branches to the step 121, deciding abnormality of the wheel $W_B$. In addition, the step 122 branches to the step 124, thereby deciding that the wheel $W_C$ is abnormal. In this case, therefore, processings are repeated through a closed loop of steps 103→104→105→106→107→110→113→115→116→119→121→122→124→125→103, actuating the indicator 15 to alert the abnormalities of the right-front wheel $W_A$, left-front wheel $W_B$ and right-rear wheel $W_C$. In this manner, even the simultaneous occurrence of abnormalities of three wheels can be detected exactly to alert the abnormalities to the driver.

As described above, since in the first mode operation, variations in rotation speeds of the wheels of the running vehicle are detected, rates of variations in rotation speeds, deviations of variation rates and deviation differences are computed on the basis of data representative of rotation speed variations and a wheel corresponding to a deviation difference outside the allowable range is decided for its abnormality to alert the abnormality of the wheel, tire abnormality can advantageously be decided with exactness by using the simplified construction for detection of revolution numbers of the wheels, computation of deviations of variations rates and comparison of deviation differences.

The foregoing description has been given assuming the abnormality of the wheel to be the tire air pressure. This is the most general factor responsible for abnormality of the wheel. However, the present invention is in no way limited to mere detection of a decrease in air pressure in the tire. The rates of variations in rotation speeds of the wheels are increased when a variety of dangerous situations for running of the vehicles occur which include, as described previously, a decrease in air pressure inclusive of puncture and other causes liable to occur during high speed running such as a standing wave phenomenon, distortion of tire wheels and relaxation of screws for fitting wheels.

It will be appreciated that according to the invention, all kinds of abnormalities of the wheels dangerous for running of the vehicle can be detected.

The first mode of operation may be modified as follows. In the first mode of operation, all of the four wheels are compared relative to each other in the way of six combinations. However, road surfaces on which the left side wheels and the right side wheels travel have different topographic geometries (unevenness) and even when the respective wheel tires are charged with the same amount of air pressure, there is a possibility that a great difference in deviation $\sigma$ occurs between the left side wheel and the right side wheel. This modification therefore takes advantage of the fact that the front and rear wheels on the same side travel on the same road surface and checks the difference in deviation $\sigma$ between the front wheel and the rear wheel on the same side. Accordingly, in this modification, processings in the steps 101, 102, 103, 104, 105, 106, 110, 111, 112, 119, 120, 121 and 125 are carried out, thereby permitting the detection of tire abnormality which is not affected by unevenness of the travel road surface.

A second mode of operation will now be described. The above modification is directed to comparison of the front and rear wheels on the same side and fails to detect abnormality when the front and rear wheels become abnormal simultaneously. The second operation mode accepts the advantages of the first operation mode and the modified mode. It should particularly be noted that the difference in unevenness between travel road surfaces for the right and left wheels is imminent to a short disatnce travel but it is evened when the vehicle travels over a long distance. From this point of view, in the second mode of operation, the deviation of rate of variation in rotation speed over a long distance (about 500 m or more) is processed in accordance with the manner of the first operation mode and the deviation of rate of variation in rotation speed over a short distance (about 50 m or less) is processed in accordance with the manner of the modified mode, so that results of decision for the long distance and those for the short distance may be subjected to logical product to eventually detect abnormalities of the wheels. Advantageously, this mode of operation can detect abnormalities of the tires accurately and rapidly without affected by disturbing factors such as unevenness of the road surface.

Figure 5:
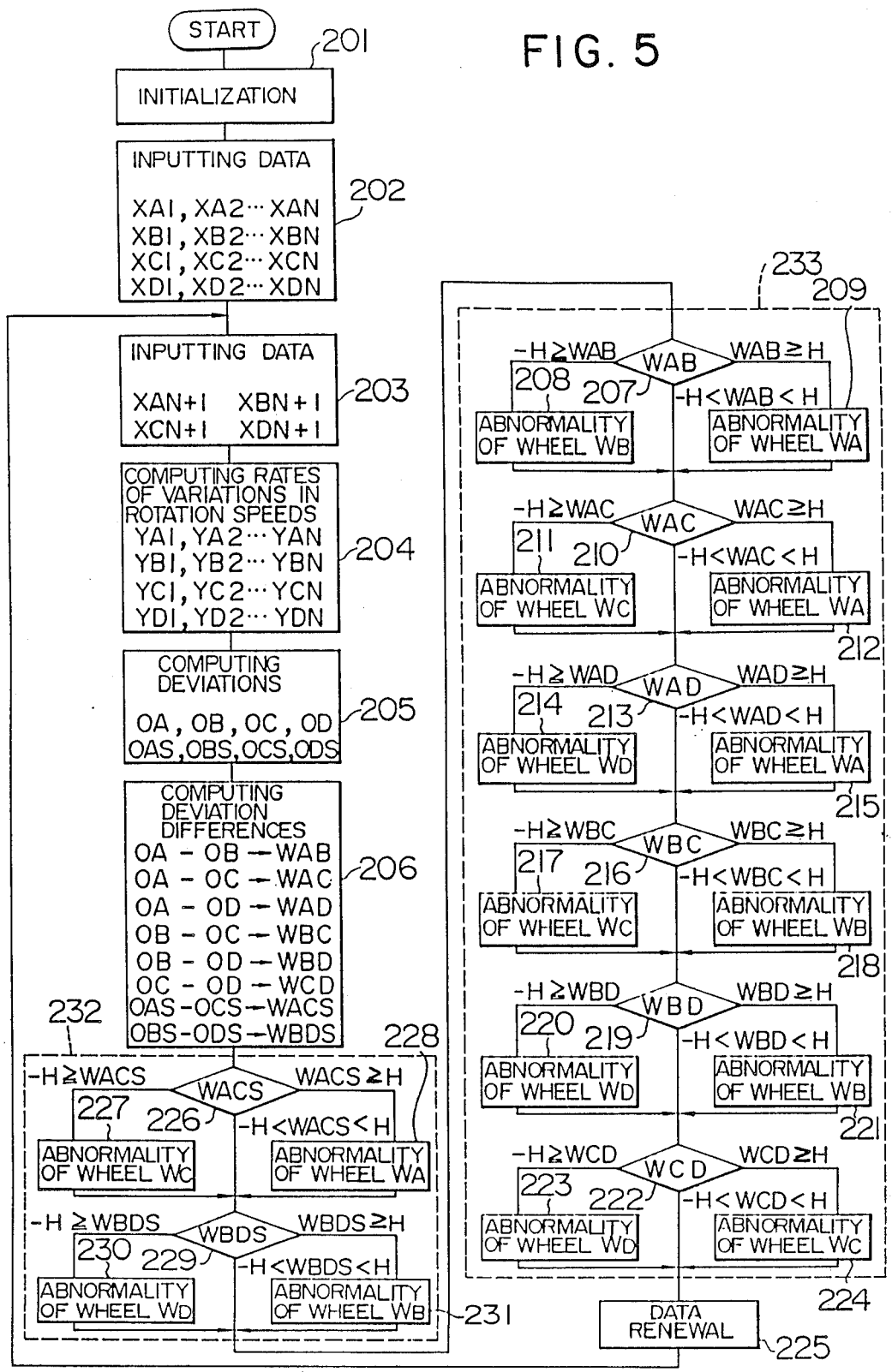
FIG. 5 is a flow chart for explaining a second mode of operation of the apparatus according to the invention.

The second operation mode will now be detailed with reference to a flow chart of FIG. 5. Steps 201, 202, 203 and 204 exactly correspond to the steps 101, 102, 103 and 104 of the first operation mode. The value of N is also about 10,000 necessary for obtaining data over about 550 m travel. In a step 205 corresponding to the step 105 of the first operation mode, pieces of deviation data σAS, σBS, σCS and σDS are additionally computed over N of about 1000, counted from the initial number, necessary for obtaining data over about 50 m travel. Then, in a step 206 corresponding to the step 106, σAS−σCS→WACS, σBS−σDS→WBDS are additionally computed. Steps 207 to 231 substantially correspond to the steps 107 to 125. But, in this second operation mode, even when abnormality of wheel or wheels is decided in a block 232, no alarm is issued if those wheels are decided for their normality in a block 233. Conversely, even when abnormality of wheel or wheels is decided in the block 233, no alarm is also issued if those wheels are decided for their normality in the block 232. Eventually, only when abnormality of wheel or wheels is decided in both the blocks 232 and 233, those wheels are ultimately decided for their abnormality and the indicator 15 is actuated to alert the abnormality to the driver.

The abnormality alarm unit exemplified as the indicator in the previous embodiment may of course be of any types which can alert abnormality to the driver. Further, information from the alarm unit may be used for other equipments.

The square mean deviation is employed in the previous embodiment for illustrative purpose only and any values indicative of deviation may be adopted.

The value of N depends on the number of notches of the rotation sensor (36 in the previous embodiment) and the travel distance for data sampling (about 550 m and about 50 m in the previous embodiment) and is no way limited to the numerical values set forth in the previous embodiment.

We claim:

1. An apparatus for detecting abnormal variations of a plurality of wheels of a vehicle comprising:
   a plurality of rotation sensor means, each for detecting rotation speeds of one of said plurality of wheels during running of the vehicle and producing detection signals indicative thereof;
   signal conversion means for converting said detection signals from said plurality of rotation sensor means into arithmetic operation signals of a form facilitating computing rates of variations in the rotation speeds;
   arithmetic operation processing means, coupled to said signal conversion means and responsive to said arithmetic operation signals for:
   (1) computing rates of variations of said rotation speeds;
   (2) comparing the computed rates of variations with each other; and
   (3) determining whether at least one of said wheels has a rate of variation abnormally deviating from the rates of variations of the other wheels; and
   alarm means responsive to signals from said arithmetic operation processing means for signaling an abnormality of said at least one wheel having the abnormally deviating variation rate.

2. A detection apparatus according to claim 1 wherein said rotation sensor means includes means for detecting a time interval over which said wheel rotates by a predetermined angle and wherein said arithmetic operation processing means computes rates of variations in time intervals detected by said rotation sensor means while the vehicle travels a predetermined distance and computes the rates of variations in rotation speeds of said wheels on the basis of the computed rates of variations in time intervals.

3. A detection apparatus according to claim 1 wherein said arithmetic operation processing means includes a microcomputer.

4. An apparatus for detecting abnormal variations of a plurality of wheels of a vehicle comprising:
   a plurality of rotation sensor means, each for detecting rotation speeds of one of said plurality of wheels during running of the vehicle, by detecting a time interval over which said wheel rotates by a predetermined angle, and producing detection signals indicative thereof;
   signal conversion means for converting said detection signals from said plurality of rotation sensor means into arithmetic operation signals of a form facilitating computing rates of variations in the rotation speeds;
   arithmetic operation processing means, responsive to said arithmetic operation signals, for:
   (1) computing rates of variations of said time intervals detected by said rotation sensor means while said vehicle travels a predetermined distance;
   (2) comparing the computed rates of variations with each other to determine the rates of variations in rotation speeds of said wheels; and
   (3) determining whether at least one of said wheels has a rate of variation abnormally deviating from the rates of variations of the other wheels; and
   alarm means responsive to signals from said arithmetic operation processing means for signaling an abnormality of said at least one wheel having the abnormally deviating variation rate.

5. An apparatus as in claim 4 wherein said arithmetic operation processing means further comprises means for averaging said rates of variations in rotation speeds for each of said plurality of wheels, and means for comparing an average value of said each of said plurality of wheels with that of another wheel to determine whether an abnormality exists.

6. An apparatus for detecting abnormal variations of four wheels of a vehicle, said wheels including left and right, front and rear wheels, comprising:
   four rotation sensor means, each for detecting a rotation speed of one of said wheels during running of the vehicle, by detecting a time interval over which said wheel rotates by a predetermined angle, and producing detection signals indicative thereof;
   signal conversion means for converting said detection signals from said plurality of rotation sensor means into arithmetic operation signals of a form facilitating computing rates of variations in the rotation speeds;
   arithmetic operation processing means, responsive to said arithmetic operation signals, for:
   (1) computing rates of variations of said time intervals detected by said rotation sensor means, while said vehicle travels a predetermined distance,
   (2) averaging said rates of variations in rotation speeds are averaged for each of said four wheels,
   (3) comparing each said average value for each of said four wheels with that of another wheel to determine whether an abnormality exists, (4) determining whether at least one of said wheels has a rate of variation abnormally deviating from the rates of variations of the other wheels,
(5) obtaining a second average value of the rates of variations for each of said four wheels while the vehicle travels a distance shorter than the predetermined distance,
(6) comparing said second average value for the rates of variation of the left-front wheel with said second average value for the left-rear wheel, and comapring said second average value of the rates of variations of the right-front wheel with said second average value of the right-rear wheel, to determine whether a second abnormality exists; and alarm means responsive to signals from said arithmetic operation processing means for signaling an alarm when either of said first or second abnormalities exist.

* * * * *